United States Patent [19]

Bergquist et al.

[11] 4,257,790

[45] Mar. 24, 1981

[54] QUICK CHANGE FILTER BAG ARRANGEMENT

[75] Inventors: Dwight H. Bergquist; Gary D. Lorimor, both of Omaha, Nebr.

[73] Assignee: Henningsen Foods, Inc., White Plains, N.Y.

[21] Appl. No.: 83,395

[22] Filed: Oct. 10, 1979

[51] Int. Cl.³ .............................................. B01D 46/02
[52] U.S. Cl. ..................................... 55/379; 55/502; 55/507; 55/509
[58] Field of Search .................. 55/375, 378, 379, 502, 55/507, 509, 302; 210/323 T, 459

[56] References Cited

U.S. PATENT DOCUMENTS

| | | | |
|---|---|---|---|
| 3,830,043 | 8/1974 | Nielsen et al. | 55/378 |
| 3,874,857 | 4/1975 | Hont et al. | 55/379 |
| 4,138,234 | 2/1979 | Kubesa | 55/379 |

FOREIGN PATENT DOCUMENTS 373424  6/1973  U.S.S.R. .................................. 55/379

Primary Examiner—David L. Lacey
Attorney, Agent, or Firm—Alexander C. Wilkie

[57] ABSTRACT

A bag assembly is described for the filter bag collectors used in spray dryers or similar equipment which permits a quick change to fresh filler bags. The bag assembly includes a cage-like support for each of the individual filter bags which is inserted within the bags and which includes a bag attachment and sealing ring at its outer end. A pin-type connecting device employing a simple lifting and turning movement permits the bag assemblies to be quickly removed and remounted.

8 Claims, 9 Drawing Figures

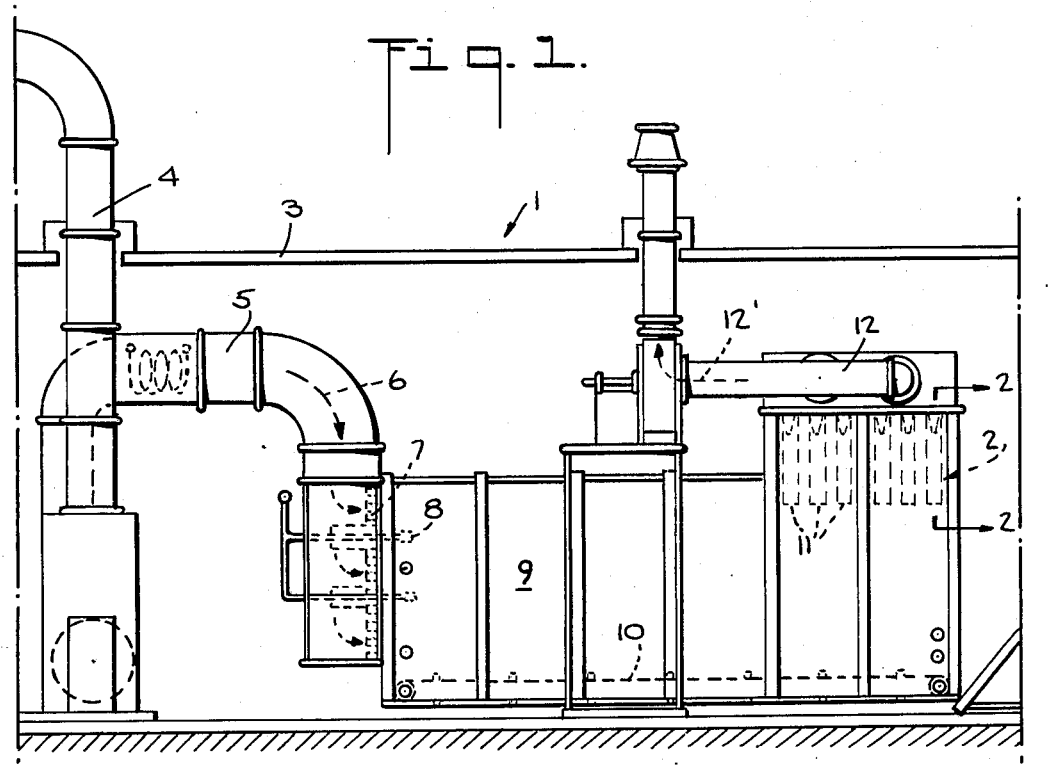
Fig. 1.
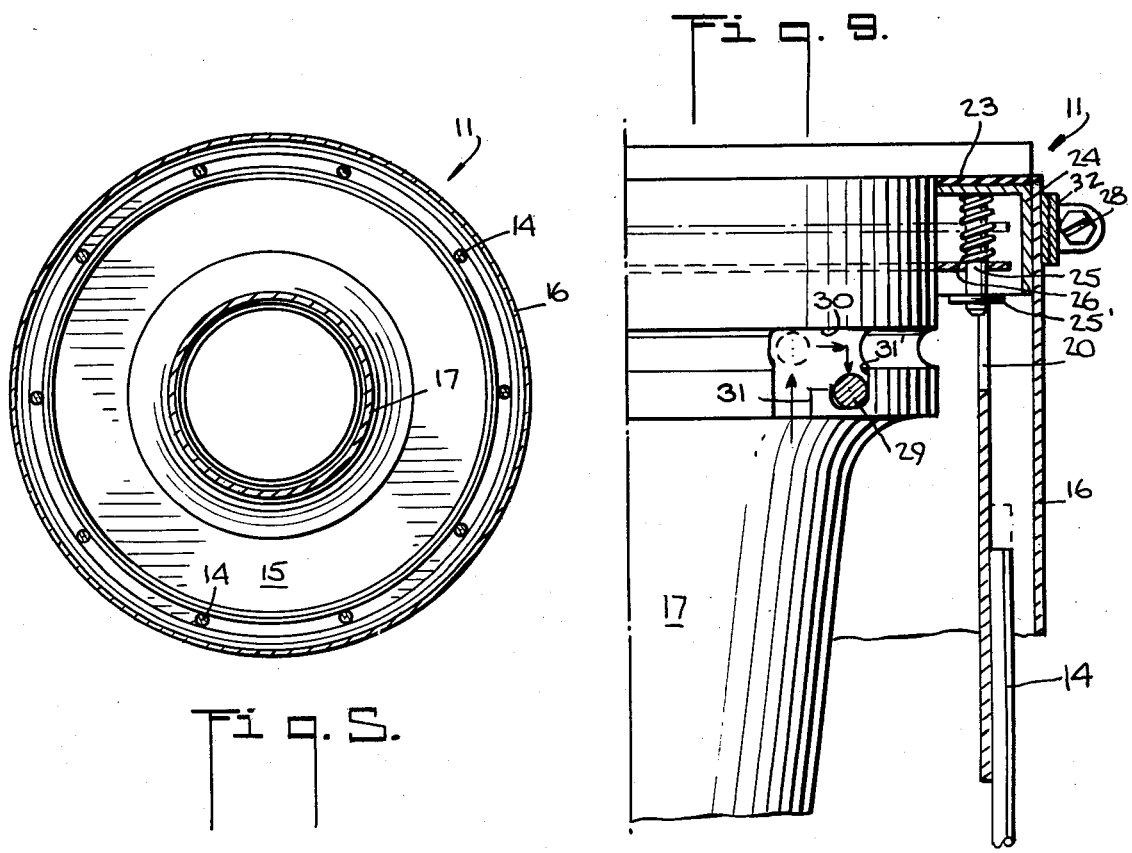
Fig. 9.
Fig. 5.

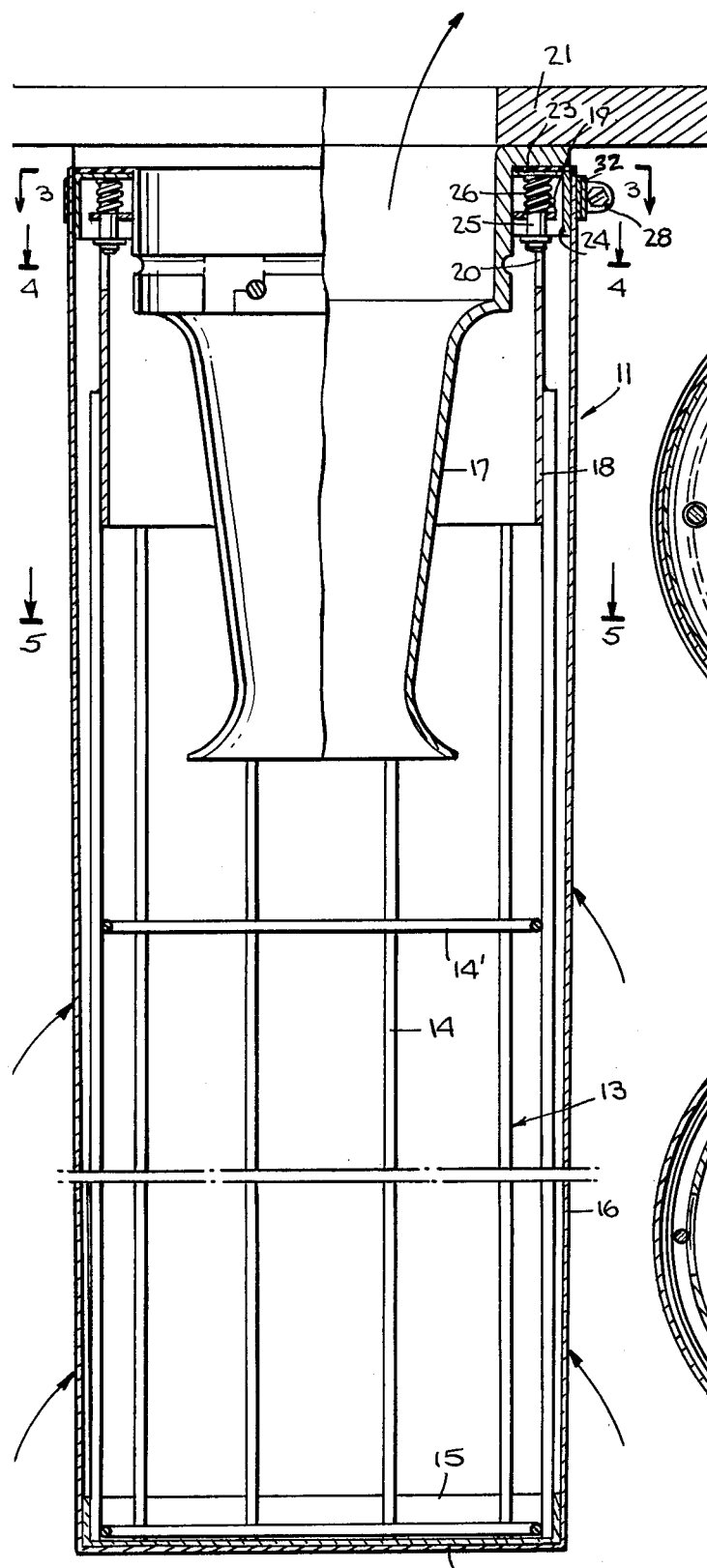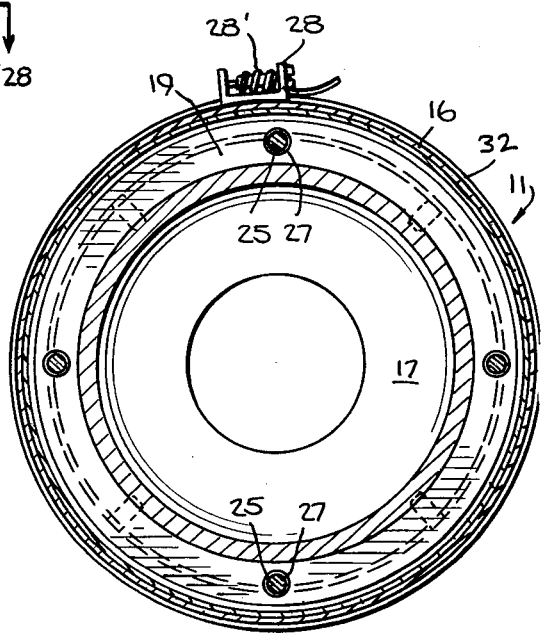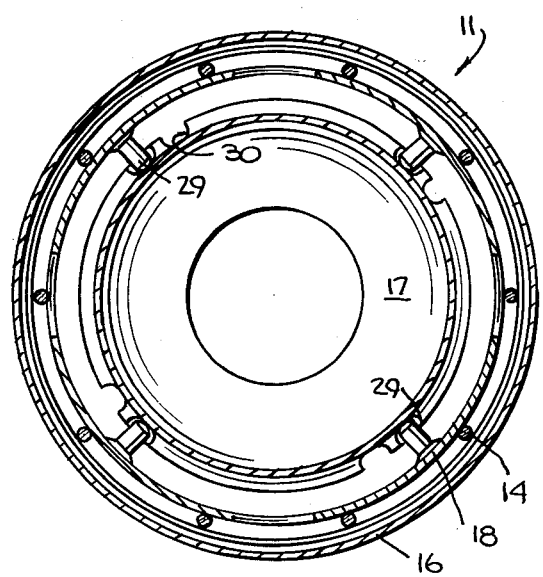

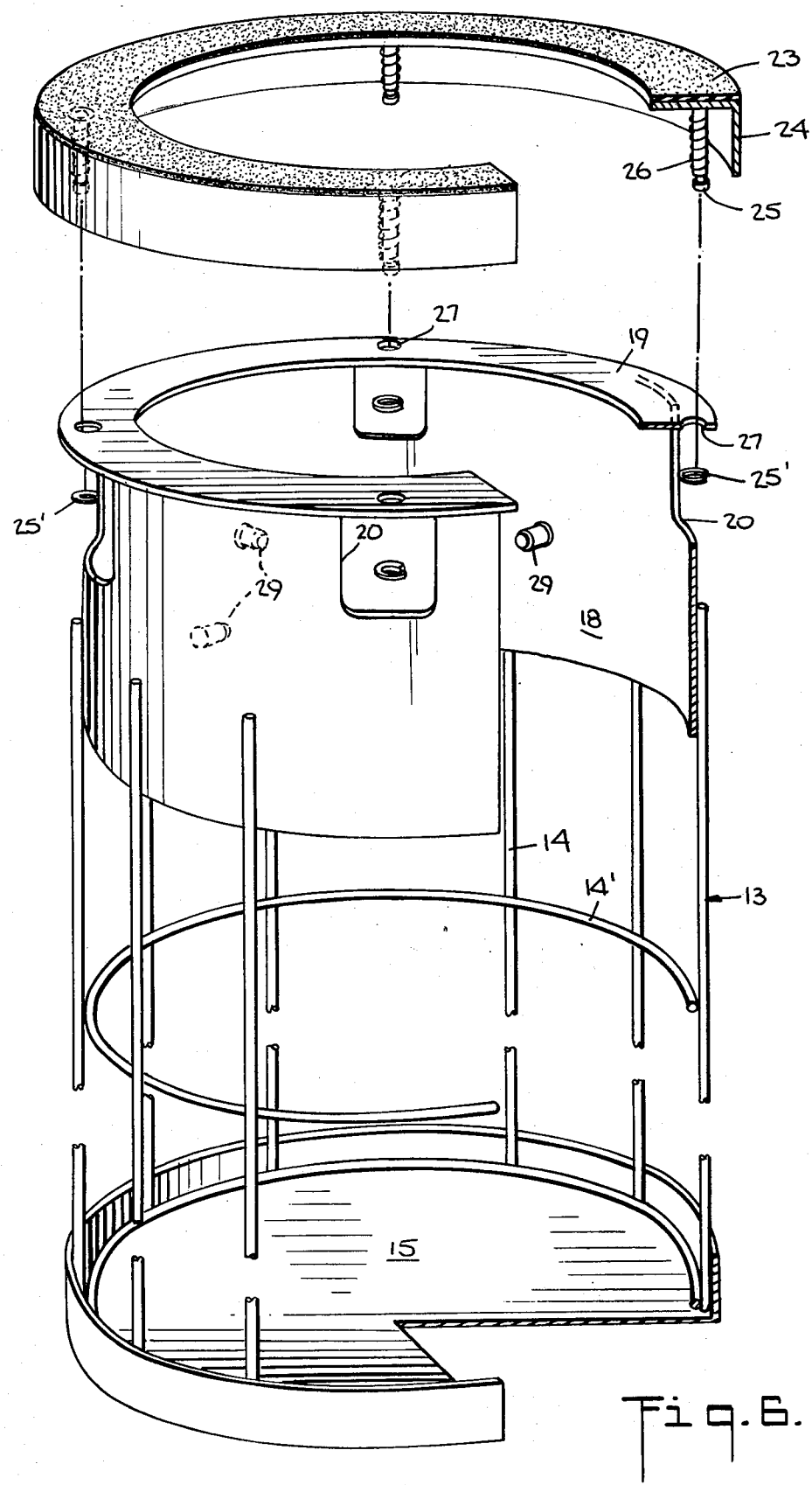

QUICK CHANGE FILTER BAG ARRANGEMENT

BACKGROUND OF THE INVENTION

The present invention relates to spray drying and similar equipment where means is provided to filter particles from the drying air or other gases at the exit end of the apparatus. A large number of filter devices of this general type are used for drying and other operations where it is necessary to have an almost perfect filtering of the air or other gases exiting from the apparatus and where the filtering materials need to be periodically changed.

A widely used and effective filtering means for this purpose is a bag collector utilizing an array of filter bags mounted at the exhaust end of the apparatus so that the exiting air passes through the filter bags as the dried powder or other particles are removed from the air flow by the filter bags. Even though there are various bag cleaning means including vibrators and pulsing means using air flow reversal, the filter bags periodically become clogged and coated and less efficient. For this reason and because of product changes it is necessary to periodically replace the individual filter bags.

In bag collector systems requiring a highly efficient filtering operation, the individual bag assembly mountings themselves must be absolutely air tight to prevent any air flow other than through the material of the filter bag. This has resulted in relatively complicated attachment means to insure a tight seal and has also resulted in relatively difficult bag change operations.

In a typical spray dryer used in the food processing industry, there may be as many as about 600 filter bag assemblies in a single installation. The periodic change of these bags will require up to 24 man hours for bag removal and an additional 24 hours for bag replacement so that a change-over requires two full days even working around the clock. A further problem in bag changing, in addition to the tight mounting required for a seal, results from the close mounting of the bags for an efficient space saving filter and where access to the individual bag assemblies is therefore restricted and difficult.

The quick change bag assembly of the present invention has a release mechanism whereby it is only necessary to simultaneously lift and twist the bags for their removal and to provide an opposite manipulation in attaching the fresh bag.

Accordingly, an object of the present invention is to provide an improved filter for spray dryers or similar equipment.

Another object of the present invention is to provide a simplified quick change means for replacing filter bags in a relatively large multi-bag filter apparatus.

Another object of the present invention is to provide a simplified and inexpensive quick change filter bag mounting.

Another object of the present invention is to provide a quick change arrangement for filter bags for substantially reducing the changeover time and expense.

Another object of the present invention is to provide a quick change arrangement for filter bags where the changeover time is reduced to less than ¼ of that previously required.

Other and further objects of the present invention will become apparent upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a side elevational view of a spray dryer including a filter bag arrangement in accordance with the present invention.

FIG. 2 is a vertical sectional view taken along line 2—2 on FIG. 1.

FIGS. 3, 4 and 5 are horizontal sectional views taken along lines 3—3, 4—4, and 5—5 on FIG. 2.

FIGS. 6, 7 and 8 are perspective views illustrating successive steps in the assembly of the filter bag assembly and the attachment of the filter bag to the cage.

FIG. 9 is a fragmentary side elevational view partially in section illustrating an attached filter bag assembly.

DESCRIPTION OF THE PREFERRED EMBODIMENT

Figure 7:
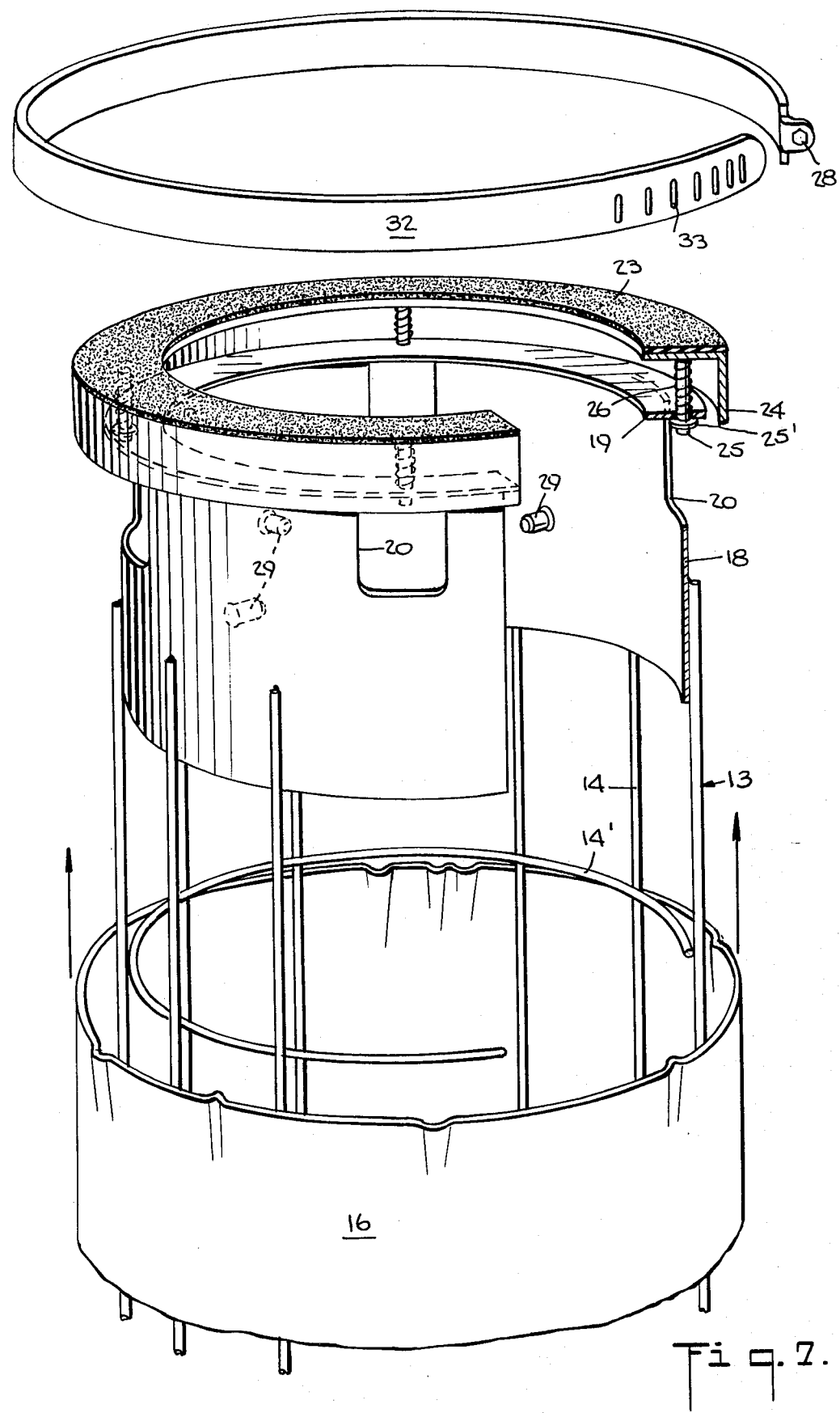

FIG. 1 illustrates a typical spray dryer 1 employing a collector bag arrangement 2 in accordance with the invention. The dryer 1 is shown positioned in a suitable housing 3 and having an air inlet 4 coupled to duct means 5 for forcing heated drying air 6 past a flow control plate 7 including liquid atomizing nozzles 8. The atomized liquid is dried in the heated air 6 in the hollow chamber 9 beyond the nozzles 8. Almost all of the dried product is deposited on the bottom of the chamber 9 or bag house 2 from which it is removed by conveyor 10. The drying air 6 passes upwardly through a number of filter bag assemblies 11 to an exhaust outlet 12. The filter bag assemblies 11 remove any powder or other particles remaining in the exiting drying air stream 12'. A typical processing dryer will include a large number of filter bag assemblies 11 with some apparatus using as may as 500 or 600 filter bag assemblies.

The bag assembly 11 of the present invention will be described for use with a system known as a pulse type filter system. These system employ a cage mounting the filter bag and surrounding a venturi. A small high-pressure jet of air is periodically released into the venturi from the top which dislodges accumulated powder from the outside of the bag.

The arrangement is useful with other mounting structures having an upper portion similar to the upper portion of the venturi described herein but which may not use the lower portion of the venturi.

Figure 8:
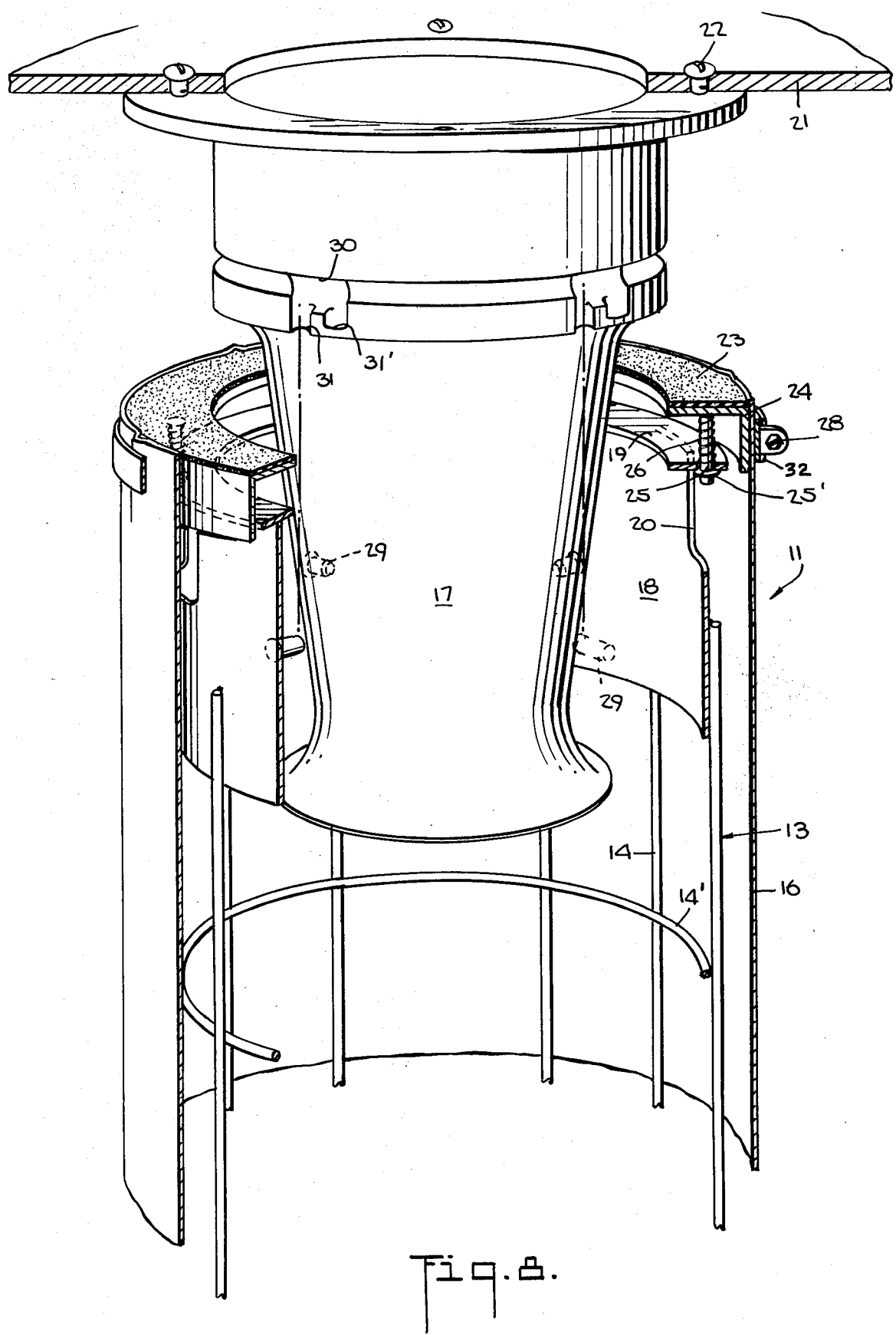

The quick change bag assembly will now be described in greater detail with references to FIGS. 2 through 9.

The purpose of the quick change bag assembly is to permit the filter bag assemblies to be readily removed and remounted on an exit plate 21 above the bag assemblies 11 and in advance of the exhaust outlet 12. One venturi 17 is fixedly attached to the plate 21 for each of the filter bag assemblies 11 with the venturis 17 being spaced in a suitable array to permit a spacing of the attached bag assemblies 11.

A cage 13 is provided for supporting each of the filter bags 16 in an open filtering position. The cages 13 comprise a number of spaced vertical rods 14 which are connected together to form a generally cylindrical cage 13 by a number of circular cross bars 14' which are welded or otherwise attached to the vertical bars 14. A dish-like metal end plate 15 is mounted at the lower end of the cage 13 for stiffening the cage 13 and for providing a support for the open filter bag 16.

The upper ends of the several rods 14 are welded or otherwise attached to a generally cylindrical cage top plate 18. The plate 18 completes the cage structure and also includes means for attaching the bag 16 and for mounting the bag assemblies 11 on the plate 21 at the venturis 17. Each cage top plate 18 has a circular top plate flange 19 attached to its upper edge.

A sealing ring 24 is resiliently attached to a top plate flange 19 by means of a number of downwardly projecting bolts 25 which have their upper ends welded or otherwise attached to the sealing ring 24. The sealing ring 24 is forced upwardly by compressed coil springs 26 positioned on each bolt 25 between the sealing ring 24 and the top plate flange 19. the bolts 25 are secured to the top plate flange 19 at spaced apertures 27 by nuts 25'. The sealing ring 24 comprises a vertical outer portion and a horizontal upper portion. The outer portion is used for bag attachment as will be described below. The upper portion mounts a resilient sealing washer 23 to form an air-tight joint between the bag assembly 11 and the mounting flange of the venturi 17.

The filter bags 16 are removably attached to the sealing ring 24 by a clamping ring 32 including a tightening screw 28, best illustrated in FIG. 3, whose worm-like threads 28' engage cooperating slots 33 in the clamping ring 32.

The filter bag assemblies 11 are mounted at their filtering position on the venturis 17 by spaced lock pins 29 on the cage top plate 18 which engage spaced slots 30 on the venturi 17. Each of the slots 30, as best illustrated in FIGS. 2 and 9, include a downwardly facing pin receiving opening 31 and a spaced locking groove 31'. In order to mount the filter bag assembly 11, it is raised upwardly over the venturi 17 so that each pin 29 passes through the entry portion 31 of the slot 30. The bag assembly 11 is then rotated in the direction to move the pins 29 along the horizontal portion of the slot and above the locking groove 31'. As the mounting pins 29 are raised in the slot 30, the sealing ring 24 is forced downwardly against the springs 26. The bolts 25 on the sealing ring 24 are proportioned to permit the necessary upward movement of the pins 29 relative to the slots 30 and also so that the compressed coil springs 26 force each bag assembly 11 downwardly when released with the pins 29 in the locking grooves 31'. In the mounted and locked position, the springs 26 remain compressed a substantial amount so that they force the sealing ring 24 upwardly to form a tight seal between the sealing washer 23 and the venturi flange thereby forming an air tight seal between the bag assembly 11 and the venturi 17.

In order to permit the above described compression of the springs 26 as the sealing ring 24 moves downwardly during the bag mounting operation, apertures 20 are provided in the cage top plate 18 below each of the bolts 25 to permit a free downward motion of each of the bolts 25 with the sealing ring 24 (see FIG. 9).

The bag assemblies 11 are raised vertically and then rotated to turn the pins 29 to a position above the slot openings 31 thereby permitting the bag assemblies 11 to be moved downwardly and clear of the venturi 17 for replacement.

The filter bag assemblies 11 are periodically replaced during a complete clean-up and also in cases where the products being processed are changed.

A sufficient number of cages 13 are available so that the bags 16 may be mountd on a second or auxiliary set of cages 13 thereby permitting an immediate change to be made and so that a fresh bag assembly 11 may be lifted and locked into place as a used bag assembly 11 is removed.

It will be seen that this invention provides a significant improvement for bag collectors for use in the bag houses of spray dryers of similar apparatus. The improved bag assemblies significantly reduce the time required for a filter bag change and reduce this time to one quarter or less of the time required for presently used collector bag assemblies. The improved bag assembly is relatively simple and requires few parts and permits a replacement set of bag assemblies to be prepared while another set is in use in the apparatus.

As various changes may be made in the form, construction and arrangement of the parts herein without sacrificing any of its advantages, it is to be understood that all matter herein is to be interpreted as illustrative and not in a limiting sense.

We claim:

1. An improved bag assembly for filter bag collectors which have an apertured air exit plate with nozzle members at each aperture, said bag assembly comprising the combination of:

a frame-like cage member;
   means for removably attaching the cage member to one of said nozzles;
   a sealing ring (resiliently mounted on said cage member);
   means for resiliently mounting said sealing ring on said cage member;
   a resilient washer positioned on said sealing ring for forming a seal between said sealing ring and said nozzle member;
   a filter bag mounted on said cage; and
   means for forming a releasable and airtight connection between said filter bag and said sealing ring.

2. The filter bag assembly as claimed in claim 1 in which said means for removably attaching said cage comprises a plurality of pins on one of said members and a corresponding number of pin engaging slots on said other member.

3. The filter bag assembly as claimed in claim 1 in which said sealing ring has an annular sealing surface mounting said resilient washer and a generally cylindrical bag mounting surface disposed at right angles to said sealing surface for mounting the filter bag.

4. The filter bag assembly as claimed in claim 1 in which said filter bag connection means comprises a clamping ring.

5. The filter bag assembly as claimed in claim 1 in which the resilient mounting means for said sealing ring comprises a plurality of bolts slidably engaging said cage with each bolt being surrounded by a coil spring positioned for being compressed when the bag assembly is mounted on the nozzle for urging said sealing washer against said nozzle.

6. An improved bag assembly for filter bag collectors which have an apertured air exit plate with nozzle members at each aperture said bag assembly comprising the combination of:

a frame-like cage member having a top plate with an annular flange and a cage bottom and a plurality of rods connnecting said top plate and said bottom;

means for movably attaching the cage member to one of said nozzles;

a sealing ring;

means for resiliently mounting said sealing ring on said cage member;

a resilient washer positioned on said sealing ring for forming a seal between said sealing ring and said nozzle member;

a filter bag mounted on said cage;

a clamping ring forming a releasable and airtight connection between said filter bag and said top plate; and said resilient means comprising a plurality of apertures in said annular flange, a bolt passing through each aperture and coupled to said sealing ring, and a spring surrounding each bolt and positioned between said annular flange and said sealing ring.

7. The filter bag assembly as claimed in claim 6 in which said means for movably attaching said cage comprises a plurality of pins on one of said members, and a corresponding number of pin engaging slots on said other member.

8. The filter bag assembly as claimed in claim 6 in which said sealing ring has an annular sealing surface mounting said sealing washer and a generally cylindrical bag mounting surface disposed at right angles to said sealing surface for mounting the filter bag.

* * * * *